United States Patent
Lee (10) Patent No.: US 12,212,263 B2
(45) Date of Patent: Jan. 28, 2025

(54) MOTOR DRIVING APPARATUS AND METHOD

(71) Applicant: HL MANDO CORPORATION, Pyeongtaek-si (KR)

(72) Inventor: KwangHyung Lee, Gwangju-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 157 days.

(21) Appl. No.: 17/878,959

(22) Filed: Aug. 2, 2022

(65) Prior Publication Data

US 2023/0031016 A1     Feb. 2, 2023

(30) Foreign Application Priority Data

Aug. 2, 2021   (KR) .................. 10-2021-0101110

(51) Int. Cl.
*H02P 29/024* (2016.01)
*H02M 1/32* (2007.01)
*H02M 7/5395* (2006.01)
*H02P 27/08* (2006.01)

(52) U.S. Cl.
CPC .......... *H02P 29/024* (2013.01); *H02M 1/325* (2021.05); *H02M 7/5395* (2013.01); *H02P 27/08* (2013.01)

(58) Field of Classification Search
CPC .......... H02P 29/024; H02P 27/08; H02P 1/08; H02M 1/325; H02M 1/0054; H02M 7/4811
See application file for complete search history.

(56) References Cited

U.S. PATENT DOCUMENTS

| | | | |
|---|---|---|---|
| 2004/0125523 A1* | 7/2004 | Edwards | H02M 7/487 361/88 |
| 2018/0278146 A1* | 9/2018 | Guven | E21B 4/04 |

OTHER PUBLICATIONS

Chip L293 data sheet (Year: 2016).*

* cited by examiner

*Primary Examiner* — Said Bouziane
(74) *Attorney, Agent, or Firm* — Hauptman Ham, LLP

(57) ABSTRACT

The present disclosure relates to a motor driving apparatus and a method. More specifically, a motor driving apparatus according to the present disclosure includes: an electric motor; an inverter that drives the electric motor using a plurality of high-side switching elements and low-side switching elements; a rotary switch that connects the electric motor and the inverter to each other; and a controller that identifies a switching element in which a malfunction has occurred in a case where a malfunction has occurred in the inverter connected to the electric motor and performs control of the rotary switch such that connection with the identified switching element is cut out, and a switching element not connected to the electric motor is connected.

8 Claims, 7 Drawing Sheets

MOTOR DRIVING APPARATUS AND METHOD

CROSS-REFERENCE TO RELATED APPLICATION

This application claims priority from Korean Patent Application No. 10-2021-0101110, filed on Aug. 2, 2021, which is hereby incorporated by reference for all purposes as if fully set forth herein.

BACKGROUND OF THE INVENTION

Field of the Invention

Embodiments relate to a motor driving apparatus and a method for replacing a malfunctioning switching element.

Description of Related Art

Generally, a vehicle steering system represents a system capable of changing a steering angle based on a steering force (or a rotation force) applied to a steering wheel by a driver of a vehicle. Recently, in order to ensure stability of a steering state by reducing a steering force applied to a steering wheel by a driver, an electric power steering (EPS) system is applied to vehicles.

Such an EPS system can provide an optimal steering state such that, by driving a motor in accordance with a speed state and a torque state of a vehicle, a light and comfortable steering sense can be provided for a driver of the vehicle at the time of low-speed driving, a heavy and safe steering sense can be provided for a driver of the vehicle at the time of high-speed driving, and rapid steering can be performed by a driver of the vehicle in case of emergency.

Recently, in addition to requests for improvement of performance of a motor included in a steering system of a vehicle, the number of requests for redundancy and reliability increase.

SUMMARY OF THE INVENTION

In such a background, the present disclosure provides a motor driving apparatus and a method for replacing a malfunctioning switching element by controlling a rotary switch.

In order to solve the problems described above, in one aspect, the present disclosure provides a motor driving apparatus including: an electric motor; an inverter that drives the electric motor using a plurality of high-side switching elements and low-side switching elements; a rotary switch that connects the electric motor and the inverter to each other; and a controller that identifies a switching element in which a malfunction has occurred in a case where a malfunction has occurred in the inverter connected to the electric motor and performs control of the rotary switch such that connection with the identified switching element is cut out, and a switching element not connected to the electric motor is connected.

In another aspect, the present disclosure provides motor driving method including: detecting a malfunction of an inverter that drives an electric motor; identifying a switching element in which a malfunction has occurred among a plurality of switching elements included in the inverter in a case where a malfunction has occurred in the inverter; and performing control of a rotary switch such that connection between the identified switching element and the electric motor is cut out, and a switching element not connected to the electric motor is connected to the electric motor.

According to the present disclosure, a motor driving apparatus and a method are capable of realizing a redundant system using less components by excluding a specific switching element connected to a motor and connecting another switching element to the motor.

DETAILED DESCRIPTION OF THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a motor driving apparatus (10) according to one embodiment of the present disclosure will be described with reference to the drawings.

Figure 1:
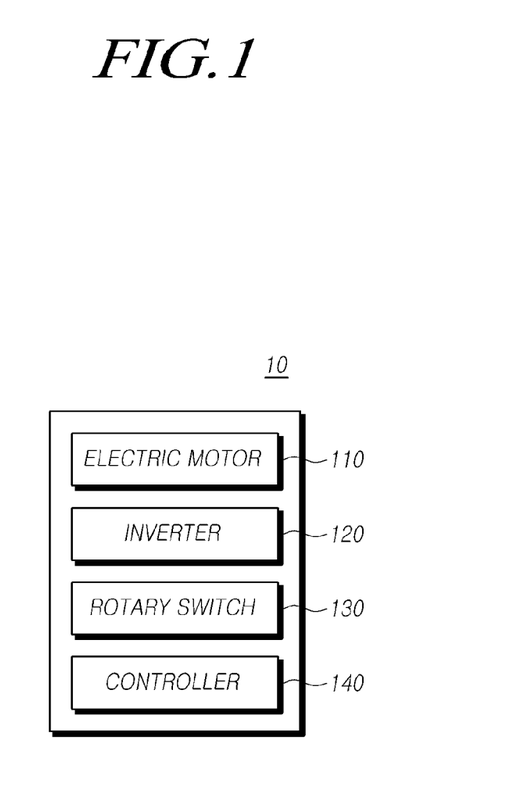
FIG. 1 is a block diagram illustrating a motor driving apparatus according to one embodiment of the present disclosure.

FIG. 1 is a block diagram illustrating a motor driving apparatus (10) according to one embodiment of the present disclosure.

The motor driving apparatus (10) according to one embodiment of the present disclosure may include an electric motor (110), an inverter (120), a rotary switch, and a controller (140).

The electric motor (110) is a machine obtaining a rotation force from electric energy and may include a stator and a rotor. As a motor according to the present disclosure, although a DC motor will be described as an example, the motor is not limited thereto.

The electric motor (110) may be driven by receiving an instruction current in accordance with a switching state of the inverter (120).

The inverter (120) may drive the electric motor (110) using a plurality of high-side switching elements and low-side switching elements. The inverter (120) may receive a motor control signal from the controller (140), and switching elements included in the inverter (120) may operate in accordance with the received control signal. The electric motor (110) may be driven by causing a current to flow therein in accordance with operating switching elements of the inverter. As the inverter (120) according to the present disclosure, although a field effect transistor inverter (120) will be described as an example, the inverter is not limited thereto.

Figure 2:
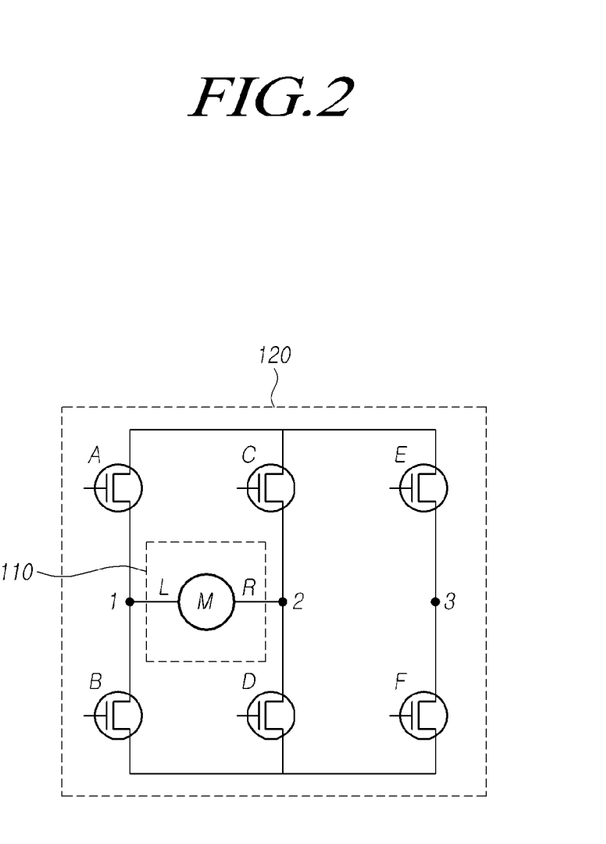
FIG. 2 is a diagram illustrating a connection state of an inverter and a motor according to one embodiment.

FIG. 2 is a diagram illustrating a connection state of an inverter (120) and a motor according to one embodiment.

Referring to FIG. 2, the inverter (120) may include a first leg (121) that includes a first high-side switching element (A) and a first low-side switching element (B), a second leg (122) that includes a second high-side switching element (C) and a second low-side switching element (D), and a third leg (123) that includes a third high-side switching element (E) and a third low-side switching element (F).

In the case of FIG. 2, the electric motor (110) may be supplied with electric power from a high-side switching element side and be driven in accordance with operations of switching elements. Then, the electric motor (110) may be connected to PCB contact points 1 and 2 illustrated in FIG. 2, that is, the first leg (121) and the second leg (122). In accordance with this, the electric motor (110), the first leg (121), and the second leg (122) may be connected to form an H-Bridge. In other words, in a case where all the switching elements (A, B, C, and D) included in the first leg (121) and the second leg (122) are normally operated, the electric motor (110) may be driven by forming an H-Bridge with the first leg (121) and the second leg (122).

In a case where all the switching elements (A, B, C, and D) included in the first leg (121) and the second leg (122) are normally operated, the first high-side switching element (A) and the first low-side switching element (B) may be in a short-circuited state or an open state in a complementary manner. For example, in a case where the first high-side switching element (A) is in the short-circuited state, the first low-side switching element (B) may be in the open state. On the other hand, in a case where the first high-side switching element (A) is in the open state, the first low-side switching element (B) may be in the short-circuited state.

In a case where all the switching elements (A, B, C, and D) included in the first leg (121) and the second leg (122) are normally operated, the first low-side switching element (B) and the second low-side switching element (D) may be in the short-circuited state or the open state in a complementary manner. For example, in a case where the first low-side switching element (B) is in the short-circuited state, the second low-side switching element (D) may be in the open state. On the other hand, in a case where the first low-side switching element (B) is in the open state, the second low-side switching element (D) may be in the short-circuited state.

Such a relation can be similarly applied between the high-side switching elements and the low-side switching elements included in legs forming an H-Bridge in a case where the electric motor (110), the second leg (122), and the third leg (123) form the H-Bridge or in a case where the electric motor (110), the first leg (121), and the third leg (123) form the H-Bridge.

The electric motor (110) may be connected to the inverter (120) at two contact points among three PCB contact points 1, 2, and 3 through a left connector lead (L) and a right connector lead (R). The PCB contact point 1 may be included in the first leg (121), the PCB contact point 2 may be included in the second leg (122), and the PCB contact point 3 may be included in the third leg (123).

Figure 3:
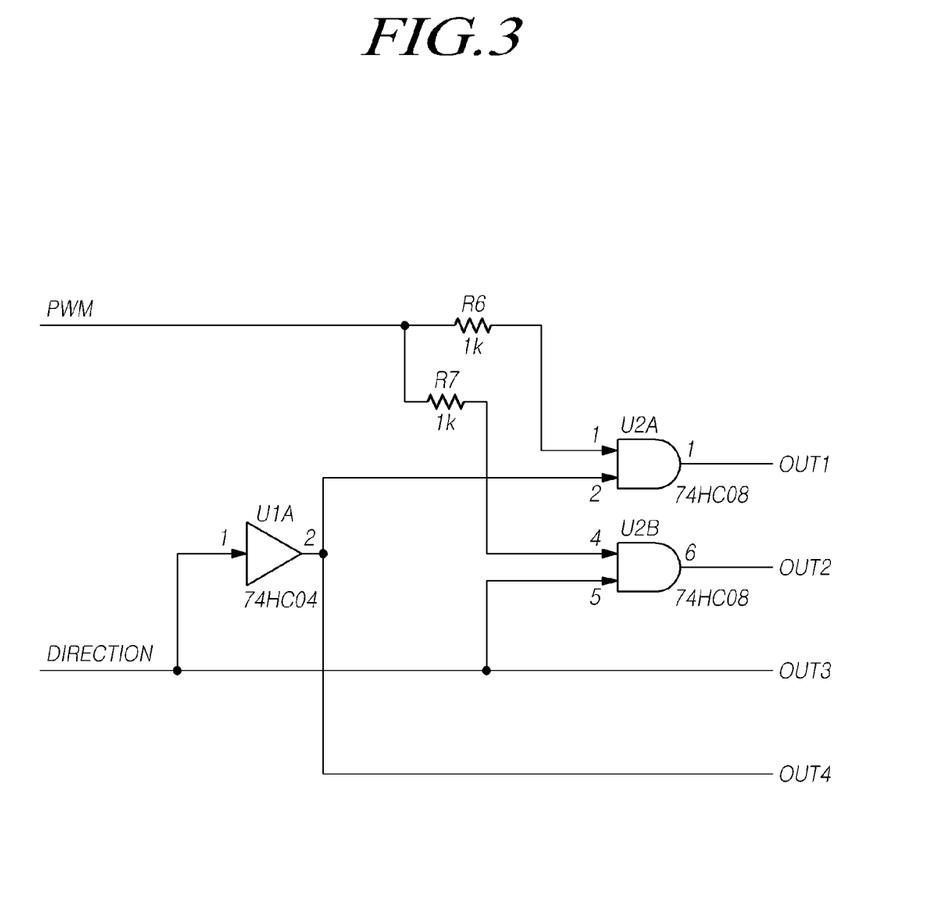
FIG. 3 is a diagram illustrating an electric motor according to one embodiment being controlled using pulse width modulation (PWM) and general-purpose input/output (GPIO).

FIG. 3 is a diagram illustrating an electric motor (110) according to one embodiment being controlled using a pulse width modulation (PWM) and a general-purpose input/output (GPIO).

Referring to FIG. 3, the electric motor (110) may be controlled a PWM and a GPIO. More specifically, while at least two or more PWMs are used for controlling a general bi-directional DC motor, a bi-directional motor may be controlled through an output generated through a combination of one PWM and a GPIO in the present disclosure.

OUT1, OUT2, OUT3, and OUT4 illustrated in FIG. 3, which are results of outputs generated using a combination of the PWM and the GPIO, may be assigned to the PCB contact points 1, 2, and 3 of the electric motor (110) illustrated in FIG. 2 in accordance with a pattern set in advance. More specifically, OUT1, OUT2, OUT3, and OUT4 may be assigned using a pattern set in advance in accordance with a combination of two PCB contact points among the PCB contact points 1, 2, and 3 used for connection with the electric motor (110). Here, in a case where the PCB contact points of the electric motor (110) are changed, as in FIGS. 5 and 6 to be described below, control signals of switching elements may be also changed at the same time, and thus an additional electronic circuit for changing control signals of switching elements in accordance with a change in the PCB contact points of the electric motor (110) may be omitted.

According to the description presented above, the motor driving apparatus (10) according to the present disclosure can decrease the number of PWMs, and thus a size of a controller such as an ECU can be decreased.

In addition, since the motor driving apparatus (10) uses one PWM, a SW-driven PWM type using a GPIO, that is, a configuration type in which a GPIO generates a PWM signal also can be easily implemented. In other words, the present disclosure can be realized also using a micro controller unit having no PWM, and thus a degree of freedom in configurating an ECU can be improved.

Figure 4:
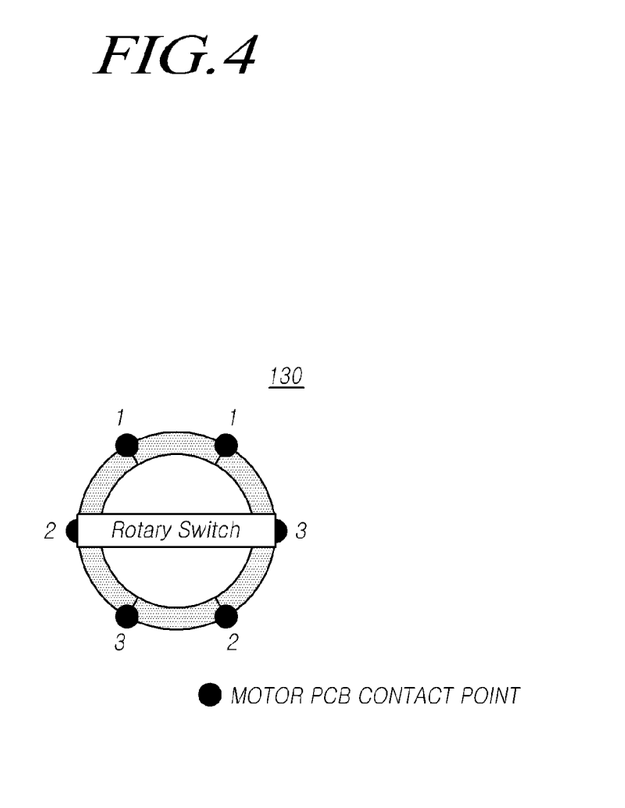
FIG. 4 is a diagram illustrating a rotary switch according to one embodiment.

FIG. 4 is a diagram illustrating a rotary switch (130) according to one embodiment.

Referring to FIG. 4, the rotary switch (130) may connect the electric motor (110) and the inverter (120).

More specifically, the rotary switch (130) may connect the inverter (120) and the electric motor (110) by selecting two legs among a plurality of legs. For example, the rotary switch (130) may connect the electric motor (110) and the PCB contact points 2 and 3. In such a case, the electric motor (110) may be driven in accordance with switching operations of the second high-side switching element (C), the second low-side switching element (D), the third high-side switching element (E), and the third low-side switching element (F) of the inverter (120).

The rotary switch (130) may connect the electric motor (110) to the inverter (120) using a plurality of combinations set in advance in accordance with rotation of the rotary switch (130). For example, a left connector lead (L) and a right connector lead (R) of the electric motor (110) may be connected to the PCB contact points 1 and 2, the PCB contact points 1 and 3, the PCB contact points 2 and 3, or the like included in the inverter (120) illustrated in FIG. 2.

In a case where a malfunction has occurred in the inverter (120) connected to the electric motor (110), the controller (140) may perform control of the rotary switch (130) such that a switching element in which the malfunction has occurred is identified, connection with the identified switching element is cut out, and a switching element not connected with the electric motor (110) is connected.

More specifically, the controller (140) may determine a damage/non-damage or malfunction/non-malfunction of each of switching elements included in legs of the inverter (120) connected to the electric motor (110). For example, the controller may detect a malfunction of each of the switching elements using a current sensor of a battery side or a ground side or detect a malfunction of each of the switching elements using a voltage sensor. In accordance with this, after a switching element in which a malfunction has occurred is identified, the controller (140) may perform control of rotation of the rotary switch (130) such that connection of the electric motor (110) with a corresponding leg including the malfunctioning switching element is cut out, and a leg that has not been connected to the electric motor (110) is connected.

In a general redundant system, a configuration for preparing a malfunction of a specific switching element by including a new extra inverter or a new FET structure having the same structure is employed. However, in the present disclosure, in a case where a malfunction has occurred in a specific switching element inside the inverter (120) driving the electric motor (110), connection with a leg including the specific switching element that is in a malfunctioning state is cut out, and a leg prepared for a malfunction of the specific switching element is connected, whereby a malfunction of the specific switching element can be prepared. In other words, according to embodiments of the present disclosure, only one leg including switching elements in preparation for a malfunction of a specific switching element is additionally included, and thus a redundant system can be realized using less components.

Figure 5:
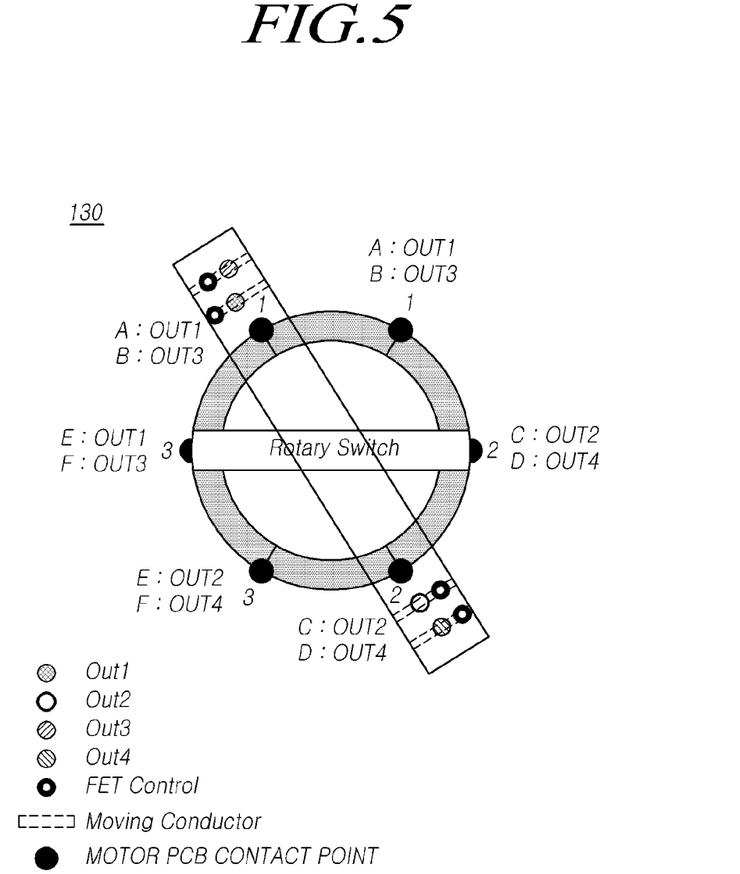
FIGS. 5 and 6 are diagrams illustrating rotation of a rotary switch and motor control signals according to one embodiment.
Figure 6:
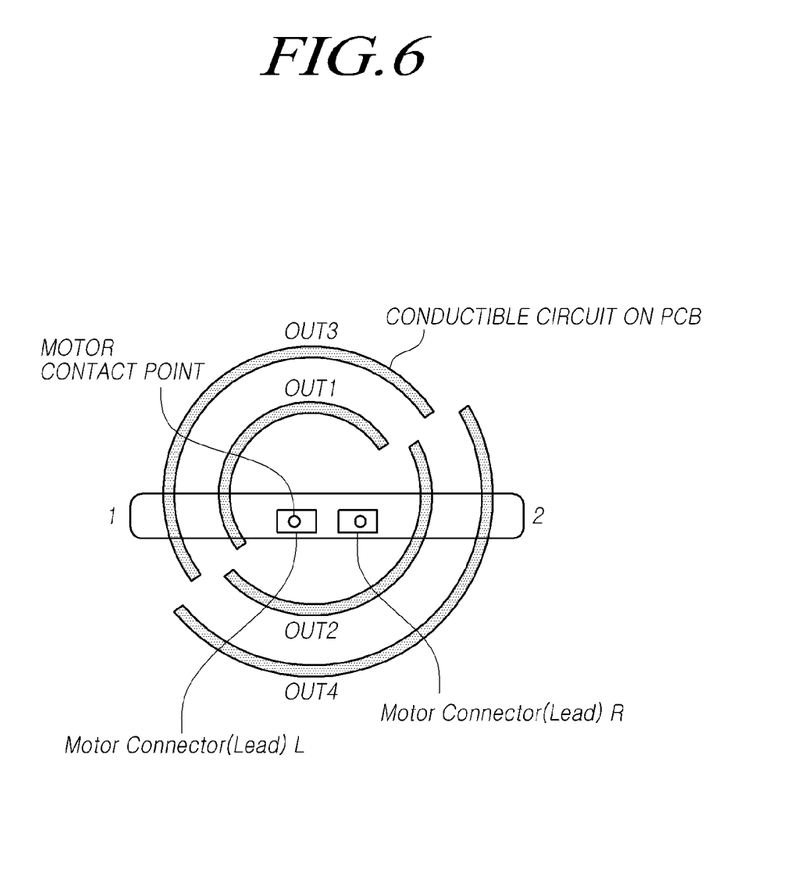

FIGS. 5 and 6 are diagrams illustrating rotation of the rotary switch (130) and motor control signals according to one embodiment.

Referring to FIG. 5, OUT1, OUT2, OUT3, and OUT4 that are results of outputs generated in accordance with a combination of a PWM and a GPIO may be assigned using a pattern set in advance in accordance with a combination of two PCB contact points among motor PCB contact points 1, 2, and 3 for connection with the electric motor (110) in accordance with the pattern set in advance.

For example, in the case of a combination of the motor PCB contact points 1 and 2, OUT1, OUT3, OUT2, and OUT4 may be respectively assigned to the first high-side switching element (A), the first low-side switching element (B), the second high-side switching element (C), and the second low-side switching element (D).

In addition, in the case of a combination of the motor PCB contact points 2 and 3, OUT2, OUT4, OUT1, and OUT3 may be respectively assigned to the second high-side switching element (C), the second low-side switching element (D), the third high-side switching element (E), and the third low-side switching element (F).

Furthermore, in the case of a combination of the motor PCB contact points 3 and 1, OUT2, OUT4, OUT1, and OUT2 may be respectively assigned to the third high-side switching element (E), the third low-side switching element (F), the first high-side switching element (A), and the first low-side switching element (B).

However, the arrangement described above is one example and thus may be changed to an arrangement sequence different from that described above.

If a leg connected to the electric motor (110) is changed in accordance with rotation of the rotary switch (130), a motor control signal set to each leg may be changed. For example, in a case where the electric motor (110) operates with the rotary switch (130) positioned at the motor PCB contact points 1 and 2, if a malfunction has occurred in the first high-side switching element (A), legs connected to the electric motor (110) are changed from the first leg and the second leg to the second leg and the third leg in accordance with a change to the motor PCB contact points 2 and 3 according to rotation of the rotary switch (130), and the electric motor (110) may be driven in accordance with motor control signals set in the second leg and the third leg. At this time, the electric motor (110) may be driven through the second high-side switching element (C), the second low-side switching element (D), the third high-side switching element (E), and the third low-side switching element (F). In such a case, in a case where motor control signals before occurrence of a malfunction of the first high-side switching element (A) are assumed to flow as they are, a current flows in an opposite direction in the electric motor (110), and thus the electric motor (110) can rotate in the opposite direction. Thus, when the legs are changed by the rotary switch (130), the motor driving apparatus (10) may detect a direction of a current and change a motor control signal set in each leg to maintain the existing direction in which the motor has rotated. Similar to a case where the electric motor (110) is connected to the motor PCB contact points 1 and 2, when the electric motor is connected to the motor PCB contact points 2 and 3 in accordance with rotation of the rotary switch (130), the second leg (122), the third leg (123), and the electric motor (110) may be connected to form an H-Bridge.

While the rotary switch (130) changes the connection positions, the output of motor control signals may be interrupted. For example, if a malfunction occurs in the first high-side switching element (A) in a state in which the rotary switch (130) is connected to the motor PCB contact points 1 and 2, the output of the motor control signals may be interrupted. Thereafter, when the rotary switch (130) is connected to the motor PCB contact points 2 and 3, and the change of the legs connected to the electric motor (110) is completed, motor control signals may be output again.

FIG. 6 is a diagram illustrating changes of motor output signals and switching elements according to rotation of the rotary switch (130).

Referring to FIG. 6, OUT1, OUT2, OUT3, and OUT4 provided in conductible circuits on a PCB may be provided in shapes of semi-circular rings to be spaced apart from each other. For example, OUT2 may be provided in a semi-circular ring shape having a radius larger than OUT1, OUT3 may be provided in a semi-circular ring shape having a radius larger than OUT2, and OUT4 may be provided in a semi-circular ring shape having a radius larger than OUT3. In other words, OUT1, OUT2, OUT3, and OUT4 may be provided in the same semi-circular ring shape and in a form in which both ends of the semi-circular ring shapes are intersected not to be in contact with other output ends.

Motor conductors connected to motor contact points may be included in the rotary switch (130) and move together in accordance with rotation of the rotary switch (130). In one embodiment, motor contact points may be provided as circuits on a PCB not in the form of points but in the form of semi-circular shapes. Thus, the motor conductors may be moved and connected to motor contact points having semi-circular shapes in accordance with rotation of the rotary switch (130).

In addition, a moving conductor illustrated in FIG. 5 may be also included in the rotary switch (130), and the moving conductor may rotate in accordance with rotation of the rotary switch (130).

For example, as illustrated in FIG. 5, in the case of a combination of the motor PCB contact points 1 and 2, the moving conductor may be connected to each of FET_A, FET_B, FET_C, and FET_D in accordance with a pattern set in advance such that OUT1, OUT3, OUT2, and OUT4 are respectively assigned to the first high-side switching element (A), the first low-side switching element (B), the second high-side switching element (C), and the second low-side switching element (D). In such a state, if a malfunction occurs in the first high-side switching element (A), as illustrated in FIG. 6, the motor conductor may move in accordance with rotation of the rotary switch (130) and be connected to the motor PCB contact points 2 and 3 having semi-circular shapes.

Simultaneously with the connection change to the motor PCB contact points 2 and 3, the moving conductor included in the rotary switch (130) rotates in a rotation range set in advance in accordance with rotation of the rotary switch (130) and may change the connection to each of FET_C, FET_D, FET_E, and FET_F in accordance with a pattern set in advance such that OUT2, OUT4, OUT1, and OUT3 are respectively assigned to the second high-side switching element (C), the second low-side switching element (D), the third high-side switching element (E), and the third low-side switching element (F).

Thus, if the motor PCB contact points are changed in accordance with rotation of the rotary switch (130), at the same time, the FET control signals are changed together, and thus a configuration of an additional circuit for changing FET control signals can be omitted.

As described above, the present disclosure can avoid a motor braking torque generated when a switching element is short-circuited. In addition, by setting a circuit-off area in the rotation area of the rotary switch (130), phase short-motor lock due to FETs can be avoided without any phase cut-off (PCO or phase-disconnector) of BLAC or a star-point relay. In addition to this, from the principle of the configuration of the system, even if an off-area is not additionally set, the motor lead is separated from a specific element in which a problem has occurred, and thus, even if an off-area is not set, generation of a braking torque for a malfunction of a switching element due to formation of a short circuit can be avoided.

Such a controller (140) may be realized by an electronic control unit (ECU), a micro controller unit (MCU), or the like.

In one embodiment, a computer system (not illustrated) such as the controller (140) may be realized by an electronic control unit (ECU). The electronic control unit may include at least one or more elements among one or more processors, a memory, a storage, a user interface inputter, and a user interface outputter, and these may communicate with each other through a bus. In addition, the computer system may further include a network interface used for connection with a network. The processor may be a CPU or a semiconductor element that executes processing commands stored in the memory and/or the storage. The memory and the storage may include various types of volatile/nonvolatile storage media. For example, the memory may include a ROM and a RAM.

Hereinafter, a motor driving method using a motor driving apparatus (10) that is capable of performing all the present disclosures described above will be described.

Figure 7:
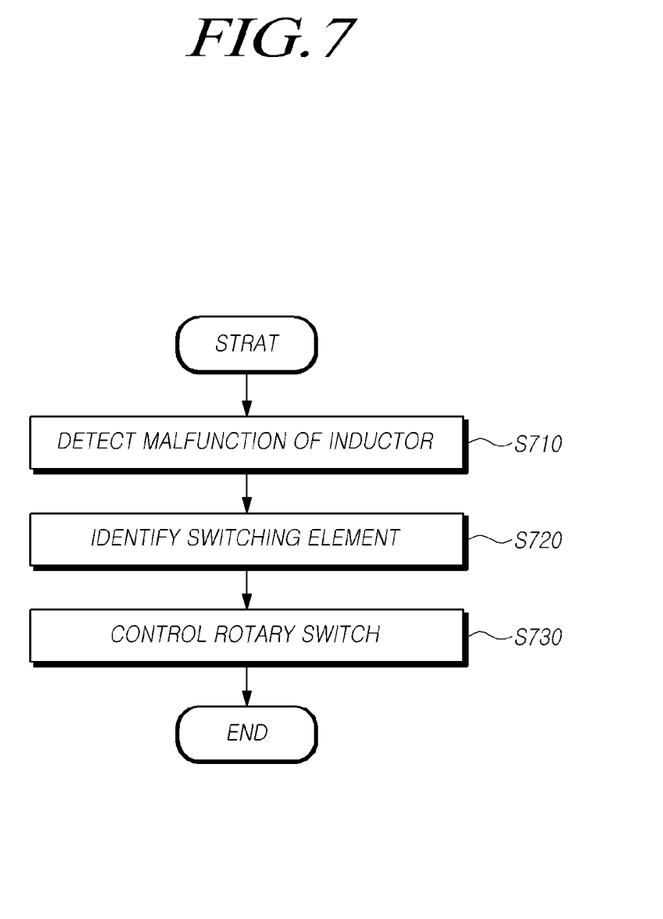
FIG. 7 is a flowchart illustrating a motor driving method according to one embodiment of the present disclosure.

FIG. 7 is a flowchart illustrating a motor driving method according to one embodiment of the present disclosure.

Referring to FIG. 7, the motor driving method according to the present disclosure may include: an inverter malfunction detecting step (S710) of detecting a malfunction of an inverter that drives an electric motor; a switching element identifying step (S720) of identifying a switching element in which a malfunction has occurred among a plurality of switching elements included in the inverter in a case where a malfunction has occurred in the inverter; and a rotary switch controlling step (S730) of performing control of a rotary switch such that connection between the identified switching element and the electric motor is cut out, and a switching element not connected to the electric motor is connected to the electric motor.

Here, the inverter may include a first leg that includes a first high-side switching element and a first low-side switching element, a second leg that includes a second high-side switching element and a second low-side switching element, and a third leg that includes a third high-side switching element and a third low-side switching element. The electric motor (110) may be connected to two legs in accordance with a combination set in advance among the plurality of legs. For example, the electric motor may be connected to the first leg and the second leg, that is a combination set in advance, to form an H-Bridge. As another example, the electric motor may be connected to the second leg and the third leg, that is another combination set in advance, to form an H-Bridge.

In the rotary switch controlling step (S730), in a case where a malfunction has occurred in the first leg, the rotary switch can be controlled such that the electric motor is connected to the second leg and the third leg.

The electric motor may be controlled using pulse width modulation (PWM) and general-purpose input/output (GPIO).

In the rotary switch controlling step (S730), output of motor control signals may be interrupted while the rotary switch changes the connection positions.

As described above, according to the present disclosure, a motor driving apparatus and a method are capable of realizing a redundant system using less components by excluding a specific switching element connected to a motor and connecting another switching element to the motor.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A motor driving apparatus comprising:
    an electric motor;
    an inverter that drives the electric motor, the inverter comprising:
        a first leg that includes a first high-side switching element and a first low-side switching element;
        a second leg that includes a second high-side switching element and a second low-side switching element; and
        a third leg that includes a third high-side switching element and a third low-side switching element;
    a rotary switch that connects the electric motor and two legs of among the first leg to the third leg of the inverter to form an H-bridge; and
    a controller that identifies a switching element in which a malfunction has occurred in a case where a malfunction has occurred in the inverter connected to the electric motor and performs control of the rotary switch such that connection with the leg having the identified switching element is cut out, and a leg having a switching element not connected to the electric motor among the first leg to the third leg is connected,
    wherein motor control signals generated using a combination of pulse width modulation (PWM) and general-purpose input/output (GPIO) are assigned to printed circuit board (PCB) contact points of the electric motor, and
    wherein, when the leg is changed in accordance with rotation of the rotary switch, the motor control signal set in each leg is changed to maintain an existing direction in which the electric motor has rotated.

2. The motor driving apparatus according to claim 1, wherein the electric motor is connected to the first leg and the second leg to form the H-bridge.

3. The motor driving apparatus according to claim 2, wherein, in a case where a malfunction has occurred in the first leg, the controller performs control of the rotary switch such that the electric motor is connected to the second leg and the third leg.

4. The motor driving apparatus according to claim 1, wherein the controller interrupts output of motor control signals while the rotary switch changes the connection positions.

5. A motor driving method comprising:
    detecting a malfunction of an inverter that drives an electric motor;
    identifying a switching element in which a malfunction has occurred among a plurality of switching elements included in the inverter in a case where a malfunction has occurred in the inverter, wherein the inverter comprises a first leg that includes a first high-side switching element and a first low-side switching element, a second leg that includes a second high-side switching element and a second low-side switching element, and a third leg that includes a third high-side switching element and a third low-side switching element; and
    performing control of a rotary switch that connects the electric motor and two legs of among the first leg to the third leg of the inverter to form an H-bridge such that connection between a leg having the identified switching element and the electric motor is cut out, and a leg having a switching element not connected to the electric motor is connected to the electric motor,
    wherein motor control signals generated using a combination of pulse width modulation (PWM) and general-purpose input/output (GPIO) are assigned to printed circuit board (PCB) contact points of the electric motor, and
    wherein, when the leg is changed in accordance with rotation of the rotary switch, the motor control signal set in each leg is changed to maintain an existing direction in which the electric motor has rotated.

6. The motor driving method according to claim 5, wherein the electric motor is connected to the first leg and the second leg to form the H-bridge.

7. The motor driving method according to claim 6, wherein, in the performing of control of a rotary switch, in a case where a malfunction has occurred in the first leg, the rotary switch is controlled such that the electric motor is connected to the second leg and the third leg.

8. The motor driving method according to claim 5, wherein, in the performing control of a rotary switch, output of motor control signals is interrupted while the rotary switch changes the connection positions.

* * * * *